Oct. 9, 1923.

E. E. WOLF 1,470,042

DISK BEARING FOR SCALES AND OTHER MECHANISMS

Filed April 7, 1920

INVENTOR
Elmer E. Wolf.
BY
Kerr, Page, Cooper & Hayward
ATTORNEYS

Patented Oct. 9, 1923.

1,470,042

UNITED STATES PATENT OFFICE.

ELMER E. WOLF, OF SPRINGFIELD, OHIO, ASSIGNOR TO INTERNATIONAL SCALE COMPANY, OF DAYTON, OHIO, A CORPORATION OF ILLINOIS.

DISK BEARING FOR SCALES AND OTHER MECHANISMS.

Application filed April 7, 1920. Serial No. 371,859.

*To all whom it may concern:*

Be it known that I, ELMER E. WOLF, a citizen of the United States of America, residing at Springfield, in the county of Clark and State of Ohio, have invented certain new and useful Improvements in Disk Bearings for Scales and Other Mechanisms, of which the following is a full, clear, and exact description.

This invention relates to shaft and journal bearings, particularly for light parts such as are used in weighing scales. In scales, which must be of high and uniform accuracy, friction must be reduced to the minimum and must be invariable. These requirements make it impracticable to use lubricants, since oils and greases in time vary in their lubricating properties, and hence introduce a variable factor which causes a corresponding impairment of the accuracy of the scale. They also tend to hold or retard the parts as equilibrium is approached and to prevent the pointer or indicating hand from quite reaching the proper position on the dial. Moreover, even if lubrication, with proper care and precautions, were permissible, users of scales could not be trusted to do the work because of their lack of knowledge and skill in scale principles and construction. Ball bearings have commonly been employed in scales and are satisfactory when in good condition, but since the balls cannot be lubricated they frequently rust, with consequent increase of friction in the bearing. I have accordingly been led to devise my present invention, which has for its chief object to provide an improved bearing, employing relatively light disks instead of balls, the disks themselves, and other operative parts, being made of non-rusting material. To this and other ends the invention consists in the novel features of construction and combinations of elements hereinafter described.

One form of the invention is illustrated in the accompanying drawing, in which—

Figure 1:
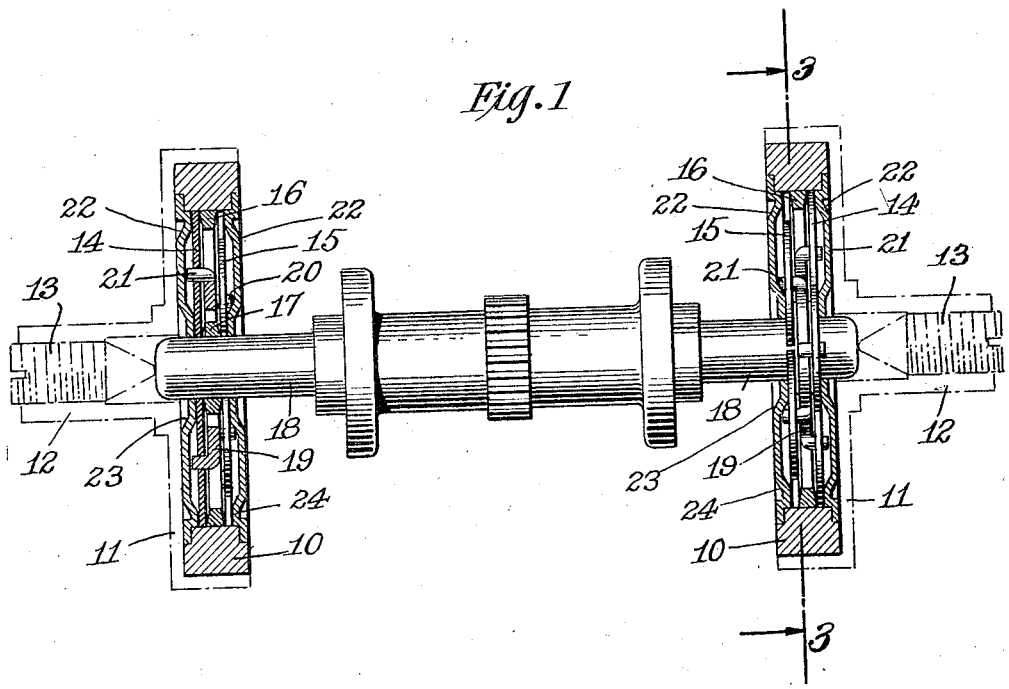
Fig. 1 is a side view partly in longitudinal section, showing two of my improved bearings as constructed to support the shaft which carries the pointer or index of an automatic weighing scale, that is, a scale in which the weight is indicated by a pointer traversing a dial.
Figure 2:
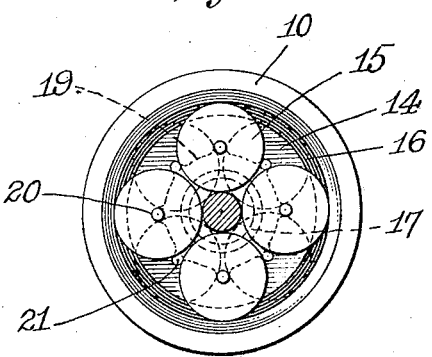
Fig. 2 is a front view of one of the bearings, the cover plate being removed to show the inner parts.
Figure 3:
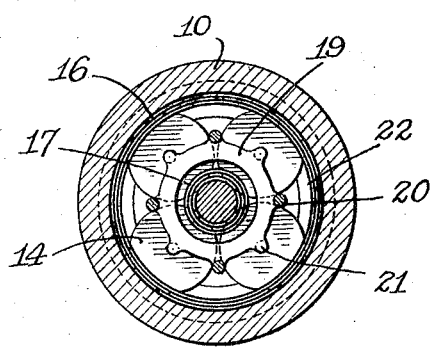
Fig. 3 is a section on line 3—3 of Fig. 1.
Figure 4:
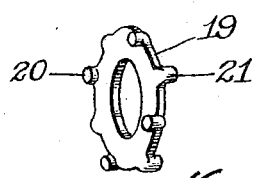
Fig. 4 is a perspective view of the spacer or spider used to keep the bearing disks properly spaced circumferentially.

The embodiment illustrated comprises a substantially ring-shaped carrier 10 composed preferably of phosphor bronze, fitted snugly into a shallow cup or housing 11, which may be provided with an axial neck 12 to receive a thrust-bearing screw 13. Inside the ring are two rows or series of light thin bearing disks 14, 15. The disks of one series are staggered with respect to those of the other, as shown, and the two series are separated by a slightly concave outer annulus or spacer 16 and by a slightly convex inner annulus or spacer 17. The latter may fit the journal 18 closely enough to rotate therewith. The spacers are made preferably of phosphor bronze and the disks of German silver. I prefer to make the bearing of a size, relative to the journal, to take four disks in each series.

The disks are spaced angularly or circumferentially of the bearing by a spider 19, preferably made of bronze, or brass, in the form of a flat ring slightly thinner than the inner spacing annulus 17, and provided on one side with four axially extending pins or studs 20 to enter the central apertures in the disks of the adjacent series, and on the other side with four similar studs 21, staggered with respect to the first set, to enter the apertures in the other disks. The studs fit the apertures loosely, so as to minimize friction at such points. The central opening in the spider is preferably considerably larger than the inner spacing annulus 17.

The outer ring 10 is rabbeted on its inner edges to receive the centrally apertured cover plates 22, which are dished to form circumferential shoulders 23, 24 at the inner and outer edges. The two series of bearing disks are thus held in their respective planes by light contact with the two cover plates and the two spacing rings 16, 17, so that they are kept in alignment and do not tilt to one side or the other. The disks are also much lighter than the steel balls usually employed in a bearing of similar capacity and hence the total friction is materially diminished. The central openings in the cover plates are just large enough to clear the journal, and since the cover plates, though removable, have a tight fit in the ring 10, the bearing is dust-proof.

It is to be understood that the invention is not limited to the particular construction herein illustrated but can be embodied in other forms without departure from its spirit.

I claim:

1. In a bearing of the type described, in combination, an outer circular carrier, inner and outer spacing rings inside of the carrier, a plurality of series of bearing disks on opposite sides of the spacing rings, and cover plates closing the sides of the carrier and contacting with said disks only at the peripheries thereof.

2. In a bearing of the type described, in combination, an outer circular carrier, a convex inner and a convex outer spacing ring inside of and concentric with the carrier, cover plates closing the sides of the carrier, at least one of the cover plates being centrally apertured to receive a journal or shaft, and a plurality of series of bearing-disks, held in separate planes by the spacing rings and cover plates, said spacing rings and cover plates contacting with said disks only at the peripheries of said disks.

3. In a bearing of the type described, in combination, an outer circular carrier, cover plates closing the sides of the carrier, inner and outer spacing rings inside the carrier in the same plane and concentric with the carrier, a plurality of series of bearing-disks held in separate planes by the spacing rings and cover plates, and means for spacing the disks around the axis of the bearing.

4. In a bearing of the type described, in combination, an outer circular carrier, cover plates closing the sides of the carrier, inner and outer spacing rings inside the carrier in the same plane and concentric with the carrier, a plurality of series of centrally apertured bearing disks held in separate planes by the spacing rings and cover plates, and an annular spider having studs extending axially into the apertures in the disks to space the latter around the axis of the bearing.

5. In a bearing of the type described, in combination, a circular outer bronze carrier, a plurality of series of German silver bearing-disks inside the carrier, and bronze elements for spacing the series of disks apart and maintaining them in their respective planes.

6. In a bearing of the type described, in combination, a circular outer bronze carrier, a plurality of series of German silver bearing disks inside the carrier, bronze elements inside the carrier and between the series of disks to space the series apart axially, and bronze cover plates for the carrier to close the same and support the adjacent disks against outward axial displacement.

7. In a bearing of the type described, in combination, an outer circular carrier, cover plates closing the sides of the carrier, inner and outer spacing rings inside the carrier in the same plane and concentric with the carrier, a plurality of series of bearing disks held in separate planes by the spacing rings and cover plates, and a device arranged between the two series of disks for spacing the disks around the axis of the bearing, said device between the disks being thinner in cross section than a cross section of the spacing rings.

8. In a bearing, in combination, a circular outer bronze carrier, a plurality of German silver bearing disks inside the carrier, and bronze elements for spacing the disks apart and maintaining them in their respective positions, said spacing elements contacting with said disks only at the peripheries thereof.

9. In a bearing, in combination, a circular outer bronze carrier, a plurality of German silver bearing disks inside the carrier, bronze elements inside the carrier and between the series of disks to space the series apart axially and bronze cover plates for the carrier to close the same and support the adjacent disks against outward axial displacement, said plates contacting with said disks only at the peripheries thereof.

10. In a bearing, in combination, a circular outer carrier, a plurality of series of bearing disks inside the carrier, and elements for spacing the series of disks apart and maintaining them in their respective planes, said elements contacting with said disks only at the peripheries thereof.

11. In a bearing, in combination, a circular outer carrier, a plurality of series of centrally apertured bearing disks inside the carrier, a centrally apertured device arranged between two series of disks having studs extending axially from its opposite sides into the apertures in the disks, and elements for spacing the series of disks apart and maintaining them in their respective planes, said elements contacting with said disks only at the peripheries thereof.

In testimony whereof I hereunto affix my signature.

ELMER E. WOLF.